UNITED STATES PATENT OFFICE.

MAXIMILIAN MATTHEUS HAFF AND THOMAS LEOPOLD WILLSON, OF OTTAWA, ONTARIO, CANADA; SAID HAFF ASSIGNOR TO SAID WILLSON.

PROCESS FOR SEPARATING PHOSPHORIC ACID FROM NATURAL PHOSPHATE.

1,076,499.     Specification of Letters Patent.     Patented Oct. 21, 1913.

No Drawing.     Application filed October 19, 1912. Serial No. 726,746.

*To all whom it may concern:*

Be it known that we, MAXIMILIAN MATTHEUS HAFF and THOMAS LEOPOLD WILLSON, both of the city of Ottawa, Province of Ontario, Dominion of Canada, have invented certain new and useful Improvements in Processes for Separating Phosphoric Acid from Natural Phosphates, of which the following is a specification.

This invention relates to an improved process for separating phosphoric acid, and the objects are to produce phosphoric acid by a process which will involve the handling of a minimum amount of a material, and may be carried out at sufficiently low cost to be commercially practicable.

The invention comprises subjecting pulverized natural phosphates with silicious material in the proportions hereinafter stated to electric heat, and recovering the phosphoric acid.

It has already been proposed in United States Patent No. 689286 to The Willson Laboratory Company as assignee of Guillaume de Chalmot to mix sand with phosphate rock and heat the mixture electrically, but the proportion of sand employed 5 per cent., is insufficient for commercial operation owing to the fact that if sufficient electric heat be employed to vaporize all the phosphoric acid, then a considerable quantity of lime will be also vaporized, which will neutralize the phosphoric acid and prevent it having a dissolving effect on new phosphate rock. The present process recovers the phosphoric acid free from lime. This materially increases the efficiency of the operation, and the process of de Chalmot while operative, is not desirable from a commercial standpoint.

We have discovered that if the quantity of silicious material, as sand, be increased many times, until, for example, from sixty to one hundred parts by weight of silicious material is mixed with one hundred parts by weight of phosphate rock which rock may contain a small percentage of silicious material, then the maximum efficiency is obtained. The minimum total quantity of silicious material which we have found necessary in the mixture to be furnaced is approximately fifty parts of silicious material to one hundred parts of natural phosphate rock which will expel all the phosphoric acid ($P_2O_5$) as such. A larger quantity of silicious material is objectionable, because with it considerable quantities of silica would be vaporized. Sand is the most suitable and available silicious material although in some instances a part of the sand may be replaced with clay to increase the fluidity of the bath. Of other silicious material which may be used, I would mention felspathic minerals.

In practising the invention any well known natural phosphate, such as calcium phosphate or the double aluminum phosphate, or iron phosphate is mixed with the silicious material, and brought to a molten state in a suitable electric furnace, preferably of the arc resistance type, and maintained in such molten state by the action of the electric current. The slag is tapped out as it accumulates and the volatile phosphoric acid is caught in any suitable way such as by water spray, or by moistened calcareous material such as raw crushed phosphate rock or lime. If desired the phosphoric acid can be readily extracted from the vapors as a salt, by bringing ammonia, potash or soda into contact with these vapors and thereby fixing the phosphoric acid in commercial form. As an alternative, the vaporous acid might be first caught in water and then fixed by adding this solution of calcareous material or to the ammonia, soda, or potash.

It may be noted that no reducing action whatever is depended upon, and it is preferable to prevent as far as possible the introduction of any substance which will have a reducing action on the phosphoric acid.

The phosphoric acid recovered is free from lime. To insure this the proportion of silica must be sufficient to prevent the vaporization of lime when the silicate formed thereby is heated during the process.

It may be pointed out that the proportions of silica herein described are sufficient to maintain a sufficient excess quantity of free silica in the bath to prevent vaporization of the lime. By free silica is meant that silica which will vaporize at a temperature of from 1200° Cent. and above in an electric furnace.

What we claim as our invention is:

1. The herein described process of obtaining phosphoric acid which comprises subjecting natural phosphate in a fused bath with sufficient excess quantity of free silica to prevent vaporization of the lime.

2. The herein described process of obtaining phosphoric acid which comprises subjecting 100 parts of natural phosphate with 60 or more parts of silicious material to electric heat and recovering the volatilized phosphoric acid.

In witness whereof we have hereunto set our hands in the presence of two witnesses.

MAXIMILIAN MATTHEUS HAFF.
THOMAS LEOPOLD WILLSON.

Witnesses:
RUSSEL B. SMART,
M. MAHONEY.